(12) United States Patent
Okuda et al.

(10) Patent No.: US 8,098,000 B2
(45) Date of Patent: Jan. 17, 2012

(54) ULTRASONIC SENSOR

(75) Inventors: Yasuyuki Okuda, Aichi-gun (JP); Makiko Sugiura, Hekinan (JP); Kenji Fukumura, Kariya (JP); Takahiko Yoshida, Okazaki (JP); Tetsuo Fujii, Toyohashi (JP)

(73) Assignee: DENSO CORPORATION, Kariya (JP)

( * ) Notice: Subject to any disclaimer, the term of this patent is extended or adjusted under 35 U.S.C. 154(b) by 581 days.

(21) Appl. No.: 12/230,039

(22) Filed: Aug. 21, 2008

(65) Prior Publication Data

US 2009/0054784 A1  Feb. 26, 2009

(30) Foreign Application Priority Data

Aug. 21, 2007  (JP) ................. 2007-214951

(51) Int. Cl.
*H01L 41/08* (2006.01)
(52) U.S. Cl. ...................................... 310/334
(58) Field of Classification Search ............. 310/322, 310/334–337
See application file for complete search history.

(56) References Cited

U.S. PATENT DOCUMENTS

| | | | | |
|---|---|---|---|---|
| 4,446,395 A * | 5/1984 | Hadjicostis | ............. | 310/327 |
| 5,329,682 A * | 7/1994 | Thurn et al. | ............. | 29/25.35 |
| 5,511,550 A * | 4/1996 | Finsterwald | ............. | 600/459 |
| 5,541,468 A * | 7/1996 | Frey et al. | ............. | 310/334 |
| 6,194,814 B1 * | 2/2001 | Hanafy et al. | ............. | 310/334 |
| 6,225,728 B1 * | 5/2001 | Gururaja | ............. | 310/334 |
| 6,396,199 B1 * | 5/2002 | Douglas et al. | ............. | 310/335 |
| 7,612,485 B2 * | 11/2009 | Sugiura et al. | ............. | 310/324 |
| 2002/0045829 A1 | 4/2002 | Nakamura et al. | | |
| 2003/0201696 A1 | 10/2003 | Muramatsu et al. | | |
| 2003/0212330 A1 | 11/2003 | Nakamura et al. | | |
| 2005/0203403 A1 | 9/2005 | Nakamura et al. | | |

FOREIGN PATENT DOCUMENTS

| | | |
|---|---|---|
| JP | A-S63-230154 | 9/1988 |
| JP | A-5-123317 | 5/1993 |
| JP | A-7-154898 | 6/1995 |
| JP | A-10-224895 | 8/1998 |
| JP | A-2000-23288 | 1/2000 |
| JP | A-2001-8940 | 1/2001 |

OTHER PUBLICATIONS

Office Action mailed Jul. 28, 2009 from Japan Patent Office in the corresponding Japanese Patent Application No. 2007-214951 (and English translation).

* cited by examiner

*Primary Examiner* — Mark Budd
(74) *Attorney, Agent, or Firm* — Posz Law Group, PLC (57) ABSTRACT

An ultrasonic sensor for detecting an object includes: a piezoelectric element having a piezoelectric body and first and second electrodes for sandwiching the piezoelectric body; an acoustic matching element having a reception surface, which receives an ultrasonic wave reflected by the object; and a circuit electrically coupled with the piezoelectric element via a wire. The piezoelectric element is embedded in the acoustic matching element so that the acoustic matching element covers at least the first electrode, a part of a sidewall of the piezoelectric element and a part of the wire between the circuit and the piezoelectric element, and the sidewall of the piezoelectric element is adjacent to the first electrode.

4 Claims, 10 Drawing Sheets

ULTRASONIC SENSOR

CROSS REFERENCE TO RELATED APPLICATION

This application is based on Japanese Patent Application No. 2007-214951 filed on Aug. 21, 2007, the disclosure of which is incorporated herein by reference.

FIELD OF THE INVENTION

The present invention relates to an ultrasonic sensor.

BACKGROUND OF THE INVENTION

An ultrasonic sensor having a piezoelectric element mounted on an acoustic matching element is well known. Here, the acoustic matching element improves transmission efficiency of ultrasonic wave, which is transmitted from and received to a device. This ultrasonic sensor includes an ultrasonic wave transmission element for transmitting the ultrasonic wave, and an ultrasonic wave reception element for receiving the ultrasonic wave, which is reflected on an object. Thus, the sensor detects a position of the object disposed around the sensor, a distance between the object and the sensor, a two-dimensional shape of the object or a three-dimensional shape of the object.

The sensor is used for, for example, an echography device used in a medical field. Specifically, JP-H05-123317 teaches an ultrasonic probe having a piezoelectric oscillator and an acoustic matching layer. The piezoelectric oscillator transmits and receives the ultrasonic wave. The piezoelectric oscillator is two-dimensionally stacked under the acoustic matching layer via a common electrode.

When the ultrasonic probe is used for an in-vehicle sensor, it is required for the probe to have environmental resistance so that the probe can be used under vehicle environment. Specifically, moisture or a water drop may adhere to an electrode or a wire connection portion in the oscillator. Thus, the electric performance or structural performance of the probe may be reduced.

Thus, it is required for the ultrasonic sensor to protect from deterioration and failure caused by environmental factor or impact.

SUMMARY OF THE INVENTION

In view of the above-described problem, it is an object of the present disclosure to provide an ultrasonic sensor.

According to a first aspect of the present disclosure, an ultrasonic sensor for detecting an object includes: a piezoelectric element having a piezoelectric body and first and second electrodes for sandwiching the piezoelectric body, wherein the piezoelectric element detects an ultrasonic wave reflected by the object, and the ultrasonic wave is initially transmitted from a transmitting element; an acoustic matching element having a reception surface, which faces the first electrode and receives the ultrasonic wave reflected by the object, wherein the acoustic matching element transmits the ultrasonic wave from the reception surface to the piezoelectric body via the first electrode; and a circuit electrically coupled with the piezoelectric element via a wire and processing a voltage signal output from the piezoelectric element. The piezoelectric element is embedded in the acoustic matching element so that the acoustic matching element covers at least the first electrode, a part of a sidewall of the piezoelectric element and a part of the wire between the circuit and the piezoelectric element, and the sidewall of the piezoelectric element is adjacent to the first electrode.

In the above sensor, the first electrode, the part of the wire between the circuit and the piezoelectric element, and a connection portion between the circuit and the piezoelectric element are protected from environmental factor such as moisture. Thus, detection accuracy of the ultrasonic wave is improved, and reliability of the sensor is improved. Thus, environmental resistance of the sensor is improved.

Alternatively, the circuit may be embedded in the acoustic matching element. In this case, impact resistance of the sensor is also improved.

Alternatively, a distance between the reception surface of the acoustic matching element and the first electrode may be almost equal to one-fourth of a wavelength of the ultrasonic wave transmitting through the acoustic matching element. In this case, acoustic pressure of the ultrasonic wave is increased, so that detection sensitivity of the sensor is improved.

According to a second aspect of the present disclosure, an ultrasonic sensor for detecting an object includes: a piezoelectric element having a piezoelectric body and first and second electrodes for sandwiching the piezoelectric body, wherein the piezoelectric element detects an ultrasonic wave reflected by the object, and the ultrasonic wave is initially transmitted from a transmitting element; an acoustic matching element having a reception surface, which receives the ultrasonic wave reflected by the object, wherein the acoustic matching element transmits the ultrasonic wave from the reception surface to the piezoelectric body; and a circuit electrically coupled with the piezoelectric element via a wire and processing a voltage signal output from the piezoelectric element. The reception surface faces a sidewall of the piezoelectric element, the sidewall which is adjacent to the first electrode, and the piezoelectric element is embedded in the acoustic matching element so that the acoustic matching element covers at least the first electrode, a part of the sidewall of the piezoelectric element and a part of the wire between the circuit and the piezoelectric element.

In the above sensor, the first electrode, the part of the wire between the circuit and the piezoelectric element, and a connection portion between the circuit and the piezoelectric element are protected from environmental factor such as moisture. Thus, detection accuracy of the ultrasonic wave is improved, and reliability of the sensor is improved. Thus, environmental resistance of the sensor is improved.

Further, since the piezoelectric element is embedded in the acoustic matching element, the impact resistance of the sensor is improved.

According to a third aspect of the present disclosure, an ultrasonic sensor mounted in a vehicle for detecting an object includes: a case attached to a body of the vehicle via a vibration damping element, wherein the vibration damping element reduces a vibration from the body; a piezoelectric element having a piezoelectric body and first and second electrodes for sandwiching the piezoelectric body, wherein the piezoelectric element detects an ultrasonic wave reflected by the object, and the ultrasonic wave is initially transmitted from a transmitting element; an acoustic matching element having a reception surface, which faces the first electrode and receives the ultrasonic wave reflected by the object, wherein the acoustic matching element transmits the ultrasonic wave from the reception surface to the piezoelectric body via the first electrode; and a circuit electrically coupled with the piezoelectric element via a wire and processing a voltage signal output from the piezoelectric element. The case accommodates the piezoelectric element, the acoustic matching element and the circuit. The piezoelectric element is embedded in the acoustic matching element so that the acoustic matching element covers the first and second electrodes, a sidewall of the piezoelectric element and a part of the wire between the circuit and the piezoelectric element, and the sidewall of the piezoelectric element is disposed between the first and second electrodes.

In the above sensor, the first electrode, the part of the wire between the circuit and the piezoelectric element, and a connection portion between the circuit and the piezoelectric element are protected from environmental factor such as moisture. Thus, detection accuracy of the ultrasonic wave is improved, and reliability of the sensor is improved. Thus, environmental resistance of the sensor is improved.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENTS

First Embodiment

Figure 1A:
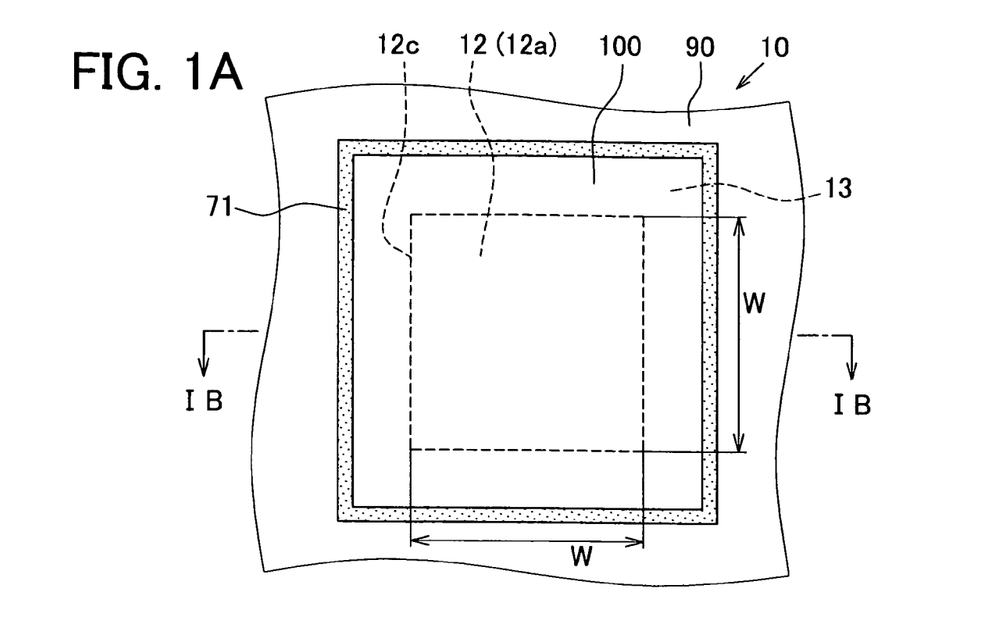
FIG. 1A is a plan view showing an acoustic matching element in an ultrasonic sensor according to a first embodiment.
Figure 1B:
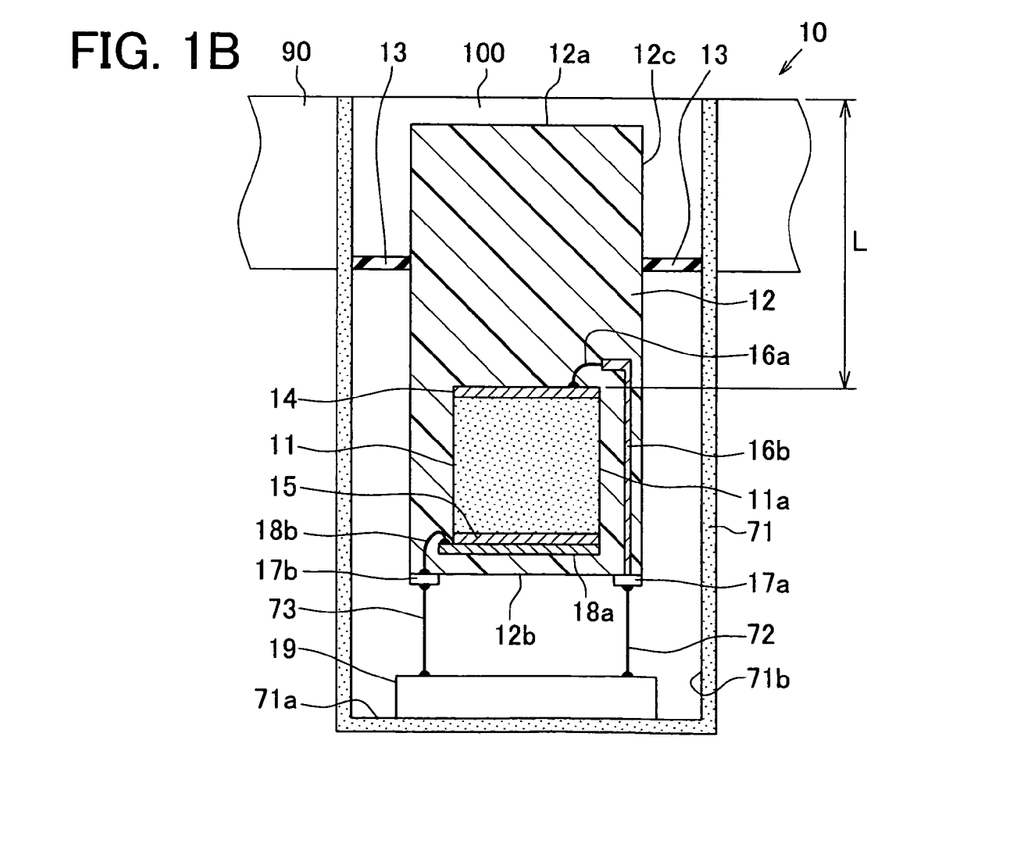
FIG. 1B is a cross sectional view showing the sensor taken along line IB-IB in FIG. 1A.

An ultrasonic sensor 10 according to a first embodiment is suitably used for an obstruction sensor mounted on a vehicle. FIG. 1A shows the sensor 10 seeing from an acoustic matching element side. Here, an upper side of FIG. 1B represents an outside of the vehicle, and an upper side of a sheet of FIG. 1A represents the outside of the vehicle.

The ultrasonic sensor 10 includes a piezoelectric element 11, an acoustic matching element 12, a vibration damping element 13 and a circuit 19. The piezoelectric element 11 detects an ultrasonic wave reflected on an object, i.e., obstacle, which is disposed in front of the vehicle. The ultrasonic wave is transmitted toward a front direction of the vehicle from an ultrasonic wave transmission element. The ultrasonic wave is received by the acoustic matching element 12, and then, oscillation of the acoustic matching element 12 is transmitted to the piezoelectric element 11. The vibration damping element 13 protects the acoustic matching element 12 against an external vibration from being transmitted to the acoustic matching element 12. The circuit 19 detects a voltage signal output from the piezoelectric element 11.

The ultrasonic sensor 10 is accommodated in a case 71 having a box shape with at least one opening. The sensor 10 is mounted on a predetermined part of a vehicle. In this embodiment, the sensor 10 is mounted on a bumper 90. The sensor 10 is fixed in the opening of the case 71 such that a reception surface 12a of the sensor 10 for receiving the ultrasonic wave is covered with a film 100, and a sidewall 12c of the acoustic matching element 12 near the reception surface 12a is fixed to the opening of the case 71 via the vibration damping element 13. The circuit 19 is fixed to a bottom 71a of the case 71. Preferably, the film 100 may be made of the same material as the vibration damping element 13 so that the film 100 functions as the vibration damping element 13.

In the sensor 10, the ultrasonic transmission element transmits the ultrasonic wave, the transmitted ultrasonic wave is reflected on the object, and the reflected ultrasonic wave is received by the reception surface 12a of the acoustic matching element 12. The received ultrasonic wave by the reception surface 12a is transmitted to the piezoelectric element 11 via the acoustic matching element 12. The transmitted ultrasonic wave in the piezoelectric element 11 is detected by the piezoelectric element 11 so that the ultrasonic wave is converted to the voltage signal.

The circuit 19 is electrically coupled with the ECU (i.e., electronic control unit, not shown). The voltage signal from the piezoelectric element 11 is input in the circuit 19 so that the circuit 19 executes calculation based on the voltage signal. Then, the circuit 19 outputs a vibration signal to the ECU. Thus, for example, a time interval between a transmission time of the ultrasonic wave and a reception time, or a phase shift between the transmitted ultrasonic wave and the received ultrasonic wave is measured, so that a distance between the device and the object is detected.

The piezoelectric element 11 is formed such that a piezoelectric material having a quadrangular prism shape made of lead zirconate titanate (PZT) is sandwiched between a pair of electrodes. Each electrode is formed by Pt or Cu sputtering method, a plating method, or a baking method of conductive paste so that the electrodes are formed on both sides of the quadrangular prism shape. Here, in the piezoelectric element 11, the first electrode 14 is formed on a reception surface side of the acoustic matching element 12, and the second electrode 15 is opposite to the first electrode 14.

The first electrode 14 is connected to one end of the lead frame 16b via the bonding wire 16a. A pod 16c for connecting to an external circuit of the sensor 10 is formed on the other end of the lead frame 16b.

The second electrode 15 is connected to an electrode member 18a via conductive material such as solder. The electrode member 18a is electrically connected to the pad 17b via the bonding wire 18b. The pad 17b is connectable to the external circuit of the senor 10.

The piezoelectric element 11 is electrically connected to the circuit 19 via the lead wires 72-73 and the pads 17a, 17b.

The acoustic matching element 12 has a quadrangular prism shape, is made of resin material having acoustic impedance lower than the piezoelectric element 11, and is formed by an insert molding method such that the piezoelectric element 11 is embedded in the acoustic matching element 12. The acoustic matching element 12 is, for example, made of poly carbonate series resin, which has small temperature dependency in acoustic velocity in the resin. Accordingly, even when temperature around the sensor 10 is changed, a change of wavelength of the ultrasonic wave in the acoustic matching element 12 with respect to temperature change is small.

The bonding wire 16a and the lead frame 16b, and the electrode member 18a and the bonding wire 18b is sealed in the acoustic matching element 12. The bonding wire 16a and the lead frame 16b provide a wiring for connecting to the first electrode 14. The electrode member 18a and the bonding wire 18b provide a wiring for connecting to the second electrode 15.

The pads 17a-17b are disposed on the bottom 12b, which faces the reception surface 12a.

The acoustic matching element 12 has a width W, which is equal to or smaller than a half of the wavelength of the ultrasonic wave in air. The reception surface 12a is parallel to the first electrode 14. The distance L between the reception surface 12a and the first electrode 14 is almost equal to one-fourth of the wavelength of the ultrasonic wave in the acoustic matching element 12.

The acoustic matching element 12 has a thickness T almost equal to one-fourth of the wavelength of the ultrasonic wave in the acoustic matching element 12 so that a standing wave is generated in the acoustic matching element 12. Thus, the ultrasonic wave input in the acoustic matching element 12 is not cancelled with an ultrasonic wave reflected at an interface between the acoustic matching element 12 and the piezoelectric element 11, so that cancellation between the input wave and the reflected wave is reduced. The ultrasonic wave is effectively transmitted to the piezoelectric element 11.

The bonding wire 16a and the lead frame 16b for providing the wire connecting to the first electrode 14, and the electrode member 18a and the bonding wire 18b for providing the wire connecting to the second electrode 15 are formed in the piezoelectric element 11. After that, when the piezoelectric element 11 is inserted and molded (i.e., insert-molded) in the acoustic matching element 12, the piezoelectric element 11 with the bonding wire 16a, the lead frame 16b, the electrode member 18a and the bonding wire 18b is arranged and fixed in a mold tool. Then, thermosetting resin such as poly carbonate series resin is injected in the mold tool by an injection molding method, a transfer molding method or the like.

Here, in some case, piezoelectric characteristics of the piezoelectric element 11 may be reduced or disappeared because of heat in case of an insert molding process. In this case, polarization processing is performed so that predetermined piezoelectric characteristics are recovered. The polarization processing is executed by, for example, applying a predetermined temperature and a predetermined voltage to the element 11 after the insert molding process.

Alternatively, the polarization process may be firstly performed after the insert molding process without performing the polarization process before the insert molding process.

The first electrode 14 and the second electrode 15 of the piezoelectric element 11, the wire for connecting to each electrode 14, 15, and their connection portion are embedded in the acoustic matching element 12, so that the piezoelectric element 11 is protected from environmental factor such as moisture. Accordingly, detection accuracy of the ultrasonic wave is improved, and reliability of the sensor 10 is improved. Thus, environmental resistance of the sensor 10 is increased.

Since the piezoelectric element 11 is embedded in the acoustic matching element 12, even when a flying object such as a small stone hits on the reception surface 12a of the acoustic matching element 12 so that impact is applied to the acoustic matching element 12, the piezoelectric element 11 is not displaced. Thus, the piezoelectric element 11 is restricted from being displaced, so that crack of the piezoelectric element 11 and removal of the piezoelectric element 11 from the acoustic matching element 12 are prevented. Thus, impact resistance of the sensor 10 is improved.

Since positioning process of the piezoelectric element 11 and the like is performed before the insert molding process, the positioning accuracy in the sensor 10 is high.

The vibration damping element 13 is disposed between the sidewall 12c of the acoustic matching element 12 and the case 71. The vibration damping element 13 fixes the sidewall 12c of the acoustic matching element 12 to the acoustic matching element 12, and prevents from transmitting vibration from the bumper 90.

The vibration damping element 13 is fixed to an inner surface 71b of the case 71 and the sidewall 12c of the acoustic matching element 12 with adhesive. The fixation method is, for example, an adhesive method, an integrating method such as a double injection molding method, a mechanical, i.e., structural fixation method such as a sandwiching method and an assembling method, or the like.

The vibration damping element 13 has acoustic impedance lower than the acoustic matching element 12 and has damping constant higher than the acoustic matching element 12. The vibration damping element 13 is made of, for example, silicon rubber. Further, the acoustic matching element 12 may have a low elastic modulus and/or a low density. For example, the acoustic matching element 12 is made of, for example, rubber, resin having multiple holes such as resin foam, or sponge.

Since the vibration damping element 13 is disposed between the bumper 90 and the acoustic matching element 12, the ultrasonic wave is prevented from being transmitted to the sidewall 12c of the acoustic matching element 12 from the bumper 90. Here, the transmission of the ultrasonic wave to the acoustic matching element 12 causes noise.

Further, when the acoustic matching element 12 has a low elastic modulus, force for reducing the vibration of the acoustic matching element 12 caused by the ultrasonic wave is comparatively small. Therefore, attenuation of the vibration of the ultrasonic wave is reduced.

Thus, the noise is reduced, and the attenuation of the ultrasonic wave is also reduced. The detection sensitivity of the ultrasonic wave is improved.

Although the acoustic matching element 12 has the quadrangular prism shape, the acoustic matching element 12 may have a cylinder shape. When the width W of the acoustic matching element 12 is equal to or smaller than a half of the wavelength of the ultrasonic wave, and when multiple ultrasonic sensors 10 are arranged in an array such that a distance between two acoustic matching elements 12 of center two sensors 10 is equal to or smaller than a half of the wavelength of the ultrasonic wave transmitting in the air, the multiple ultrasonic sensors 10 have high detection accuracy. In this case, even when the width W of the acoustic matching element 12 is larger than the half of the wavelength of the ultrasonic wave in the air, the acoustic matching element 12 functions as an acoustic matching means.

Although the acoustic matching element 12 is made of poly carbonate series resin in this embodiment, the acoustic matching element 12 may be made of poly ether imide series resin, epoxy resin or the like.

Although the electrode member 18a is arranged between the second electrode 15 and the pad 17b, the second electrode 15 may be directly connected to the pad 17b via the bonding wire 18b.

The piezoelectric element 11 may be made of poly vinylidene fluoride (PVDF) material. The PVDF material is resin, so that the acoustic impedance difference between the acoustic matching element 12 and the piezoelectric element 11 is small. Thus, the attenuation of the vibration of the ultrasonic wave can be minimized. Further, the piezoelectric element 11 is easily inserted and molded in the acoustic matching element 12. Here, when the acoustic impedance of the PVDF material is substantially equal to the acoustic matching element 12, the length of the acoustic matching element 12 including the length of the piezoelectric element 11 may be preferably equal to a half of the wavelength of the ultrasonic wave.

In FIG. 1B, the whole area of each pad 17a, 17b is exposed from the acoustic matching element 12. Alternatively, only the surface of each pad 17a, 17b may be exposed from the acoustic matching element 12 by insert-molding the pad 17a, 17b in the acoustic matching element 12.

The piezoelectric element 11 may functions as an ultrasonic wave transmitting element for transmitting the ultrasonic wave. In this case, since the piezoelectric element 11 combines with the transmitting element, it is not necessary to form an additional ultrasonic wave transmitting element. Thus, the dimensions of the sensor 10 are minimized.

When the piezoelectric element 11 functions as a transmitting element, i.e., when the ultrasonic wave is transmitted from the sensor 10, the circuit 18 outputs a voltage signal to the piezoelectric element 11, based on a control signal output from the ECU for controlling the acoustic pressure and the phase of the transmitting ultrasonic wave. Based on the voltage signal, the piezoelectric element 11 oscillates so that the ultrasonic wave having a predetermined acoustic pressure and a predetermined phase is output. The ultrasonic wave output from the piezoelectric element 11 is transmitted to the acoustic matching element 12 so that the ultrasonic wave is output from the reception surface 12a of the acoustic matching element 12 to the outside of the vehicle.

The piezoelectric element 11 may function only transmitting the ultrasonic wave. When multiple piezoelectric elements 11 are formed in the sensor 10, one of the piezoelectric elements 11 functions only transmitting the ultrasonic wave, and another one of the piezoelectric elements 11 functions only receiving the ultrasonic wave. Thus, a circuit for transmitting the ultrasonic wave and another circuit for receiving the ultrasonic wave are independently formed in the sensor 10. Thus, a structure of the circuits is simplified. Further, reverberation of transmitting the ultrasonic wave does not affect the element for receiving the ultrasonic wave, and thereby, the sensor 10 can receive the reflection wave from an obstacle disposed near the sensor 10.

In the sensor 10, the piezoelectric elements 11 is implanted in the acoustic matching element 12 in the insert-molding process such that at least the first electrode 14 and a part of the sidewall 11a of the piezoelectric element 11 adjacent to the first electrode 14 are covered with the acoustic matching element 12. In this embodiment, the whole of the piezoelectric elements 11 is covered with the acoustic matching element 12. Further, at least a part of the wiring for electrically connecting between the piezoelectric element 11 and the circuit 19, i.e., at least a part of the wiring for connecting to the first electrode 14 and the wiring for connecting to the second electrode 15 are embedded in the acoustic matching element 12. Thus, the first electrode 14, the second electrode 15, the wiring for connecting to the first electrode 14, the wiring for connecting to the second electrode 15, and their connection portions are prevented from environmental factor such as moisture. Thus, the detection accuracy of the ultrasonic wave is improved, so that the reliability of the sensor 10 is increased. Specifically, the environmental resistance against the environmental factor of the sensor 10 is improved.

Since the piezoelectric element 11 is inserted and held in the acoustic matching element 12 so that the displacement of the piezoelectric element 11 is limited, even if a flying matter such as a small stone hits on eth reception surface 12a of the acoustic matching element 12 so that the impact is applied to the reception surface 12a, a crack of the piezoelectric element 11 and removal of the piezoelectric element 11 from the acoustic matching element 12 are prevented. Thus, the impact resistance of the sensor 10 is increased.

Further, after the piezoelectric element 11 and the like are positioned, they are insert-molded. Thus, the positioning accuracy is high in the sensor 10.

In the acoustic matching element 12, the distance between the reception surface 12a and the first electrode 14 is almost equal to one-fourth of the wavelength of the ultrasonic wave transmitting in the acoustic matching element 12, the standing wave caused by the ultrasonic wave received in the acoustic matching element 12 is generated. Thus, the acoustic pressure of vibration in the acoustic matching element 12 is increased, so that the detection sensitivity of the ultrasonic wave is improved.

When the acoustic matching element 12 is made of poly carbonate series resin, the temperature change of the acoustic velocity in the acoustic matching element 12 is comparatively small. Thus, the wavelength change in relation to the temperature change is reduced, so that the transmission of the vibration is stably executed. Further, the poly carbonate series resin material is suitably used for the insert-molding method, so that the acoustic matching element 12 is easily manufactured.

Since the piezoelectric element 11 is made of lead zirconate titanate (PZT) having high piezoelectric constant, the piezoelectric element 11 can receive the ultrasonic wave having a small acoustic pressure. Thus, the sensitivity of the sensor 10 is improved.

Further, when the piezoelectric element 11 is made of poly vinylidene fluoride (PVDF) series material, the difference of acoustic impedance between the piezoelectric element 11 and the acoustic matching element 12 is minimized, so that the attenuation of the ultrasonic wave can be reduced. Further, since the PVDF material is resin, the piezoelectric element 11 is easily insert-molded in the acoustic matching element 12.

After the piezoelectric element 11 is easily insert-molded in the acoustic matching element 12, the piezoelectric element 11 is processed in the polarization process. Even if the piezoelectric characteristics of the piezoelectric element 11 is reduced or disappeared by a heat treatment in the insert-molding process of the piezoelectric element 11, the piezoelectric characteristics of the piezoelectric element 11 is recovered, and predetermined piezoelectric characteristics are obtained.

The piezoelectric element 11 may function as the transmitting element for transmitting the ultrasonic wave. In this case, there is no need to form an additional transmitting element in the sensor 10, so that the dimensions of the sensor 10 are minimized.

Second Embodiment

Figure 2:
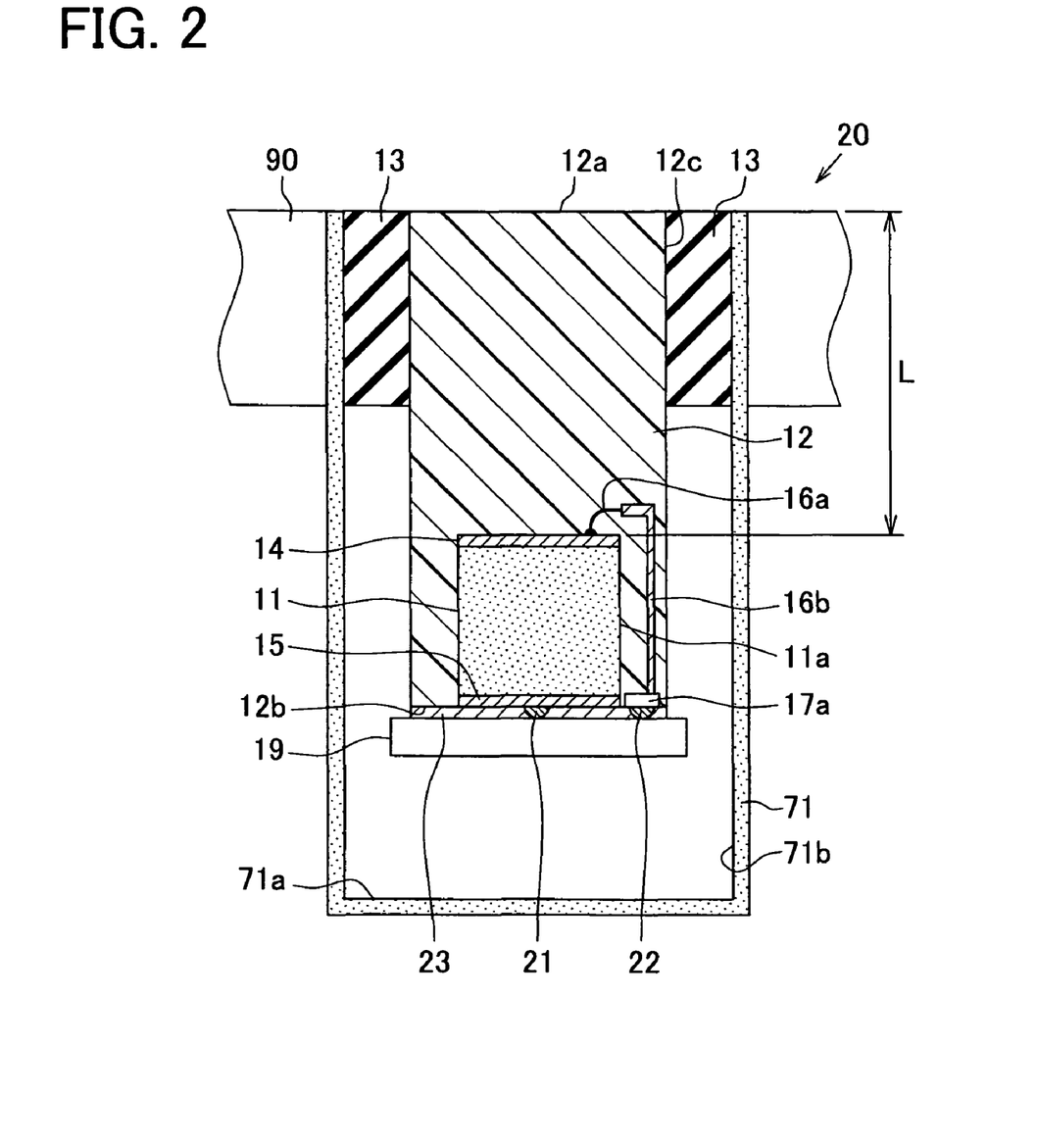
FIG. 2 is a cross sectional view showing an ultrasonic sensor according to a second embodiment.
Figure 3:
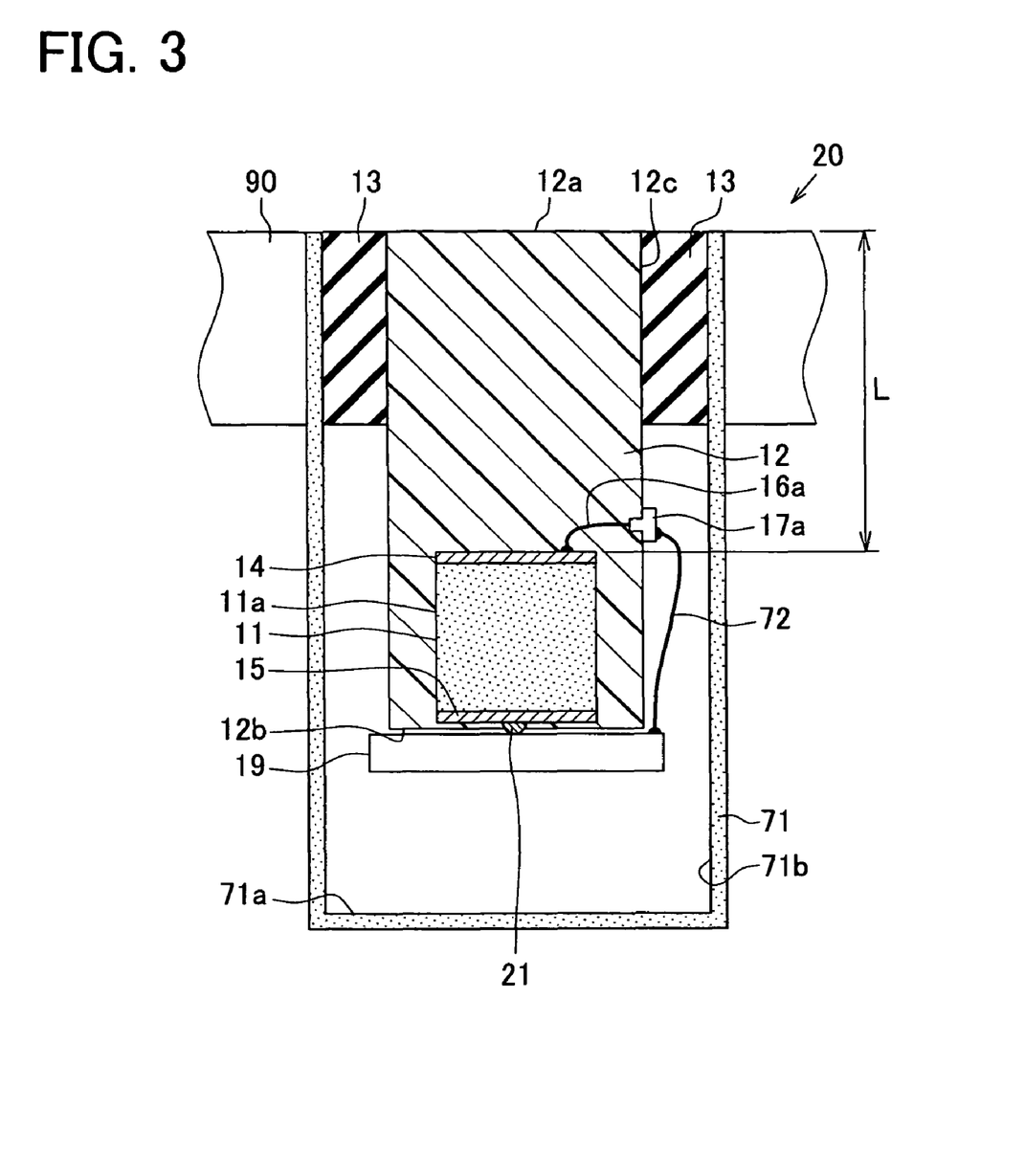
FIG. 3 is a cross sectional view showing an ultrasonic sensor according to a modification of the second embodiment.

FIG. 2 shows an ultrasonic sensor 20 according to a second embodiment, and FIG. 3 shows another ultrasonic sensor according to a modification of the second embodiment.

As shown in FIG. 2, in the sensor 20, the piezoelectric element 11 is coupled with the circuit 19 via bumps 21, 22.

The piezoelectric element 11 is inserted in the acoustic matching element 12 such that the second electrode 15 is exposed from the bottom 12b of the acoustic matching element 12. The first electrode 14 is connected to one end of the lead frame 16b via the bonding wire 16a. A pad 17a is formed on the other end of the lead frame 16b. The bonding wire 16a and the lead frame 16b are sealed in the acoustic matching element 12. The surface of the pad 17a is exposed from the bottom 12b of the acoustic matching element 12, and embedded in the acoustic matching element 12.

The bump 21 is formed on the second electrode 15, and the other bump 22 is formed on the pad 17a. The bumps 21, 22 electrically connect between the circuit 19 and the piezoelectric element 11. Specifically, the bump 21 corresponds to the wire for connecting between the electrode 15 and the circuit 19. The connecting wire between piezoelectric element 11 and the circuit 19 can be short, so that noise from the connecting wire is reduced. Thus, the detection accuracy of the ultrasonic wave is improved.

As shown in FIG. 3, the piezoelectric element 11 having the bump 21 on the second electrode 15 may be insert-molded in the acoustic matching element 12 such that a part of the bump 21 is exposed from the bottom 12b.

Here, the pad 17a for electrically connecting to the first electrode 14 via the bonding wire 16a may be formed on the sidewall 12c of the acoustic matching element 12.

The number and the arrangement of the bump 21 may be different from the sensor shown in FIG. 2. When multiple bumps 21 are formed in the sensor 10, parallelism and bonding strength between the piezoelectric element 11 and the circuit 19 are improved. Here, the bumps 21 may be arranged symmetric with respect to the center of the second electrode 15.

An under-fill material 23 may be formed in a clearance between the second electrode 15 and the circuit 19. By using the under-fill material 23, the environmental resistance and the bonding strength are improved. A spacer such as a bonding tape may be formed between the second electrode 15 and the circuit 19 so that the parallelism between the second electrode 15 and the circuit 19 is secured.

The lead frame 16b may be directly connected to the first electrode 14 via solder. Further, the second electrode 15 may be die bonded to the circuit 19.

The sensor 20 provides effects similar to the sensor 10 according to the first embodiment. Further, in the sensor 20, the bump 21 provides the wire for connecting between the second electrode 15 and the circuit 19, so that the noise from the wire is reduced, and the detection sensitivity of the ultrasonic wave is improved.

Third Embodiment

Figure 4:
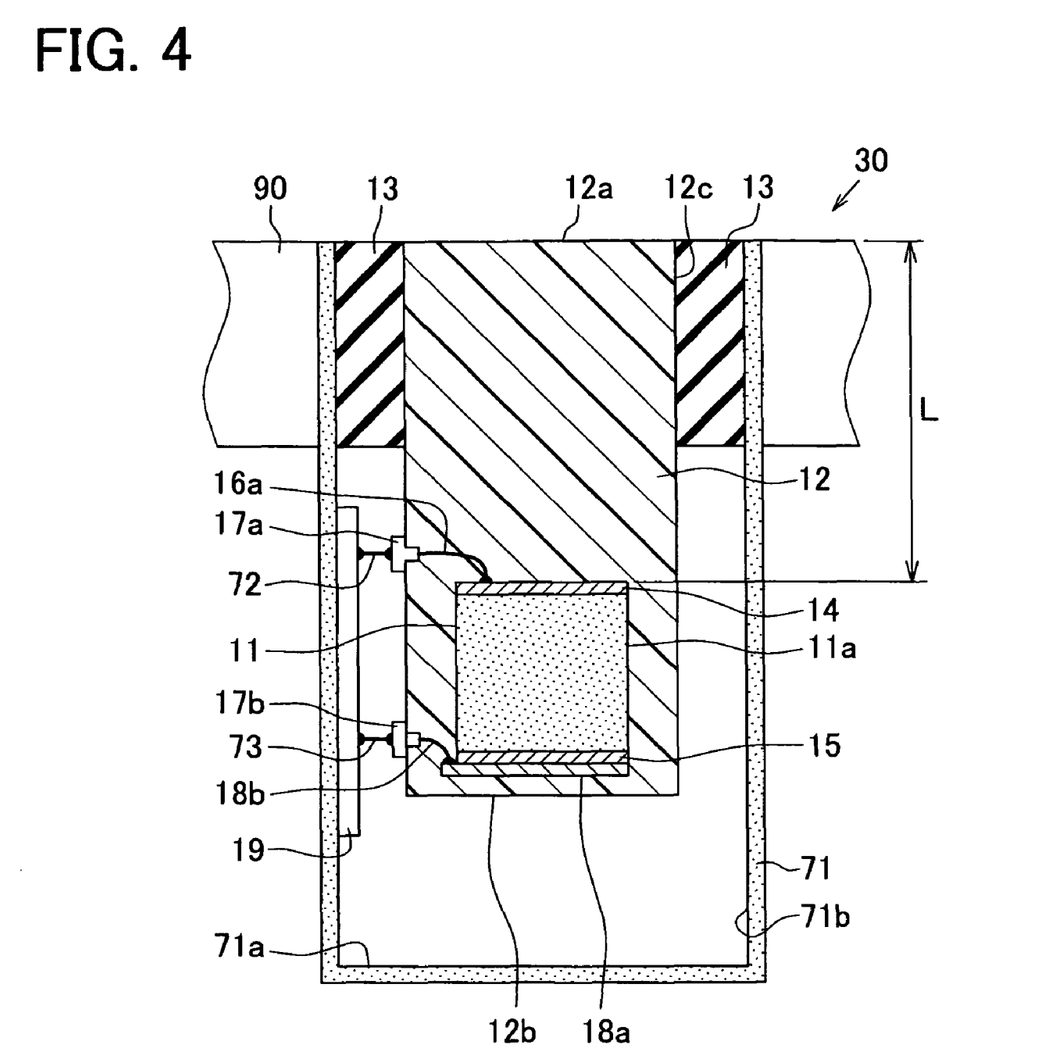
FIG. 4 is a cross sectional view showing an ultrasonic sensor according to a third embodiment.
Figure 5:
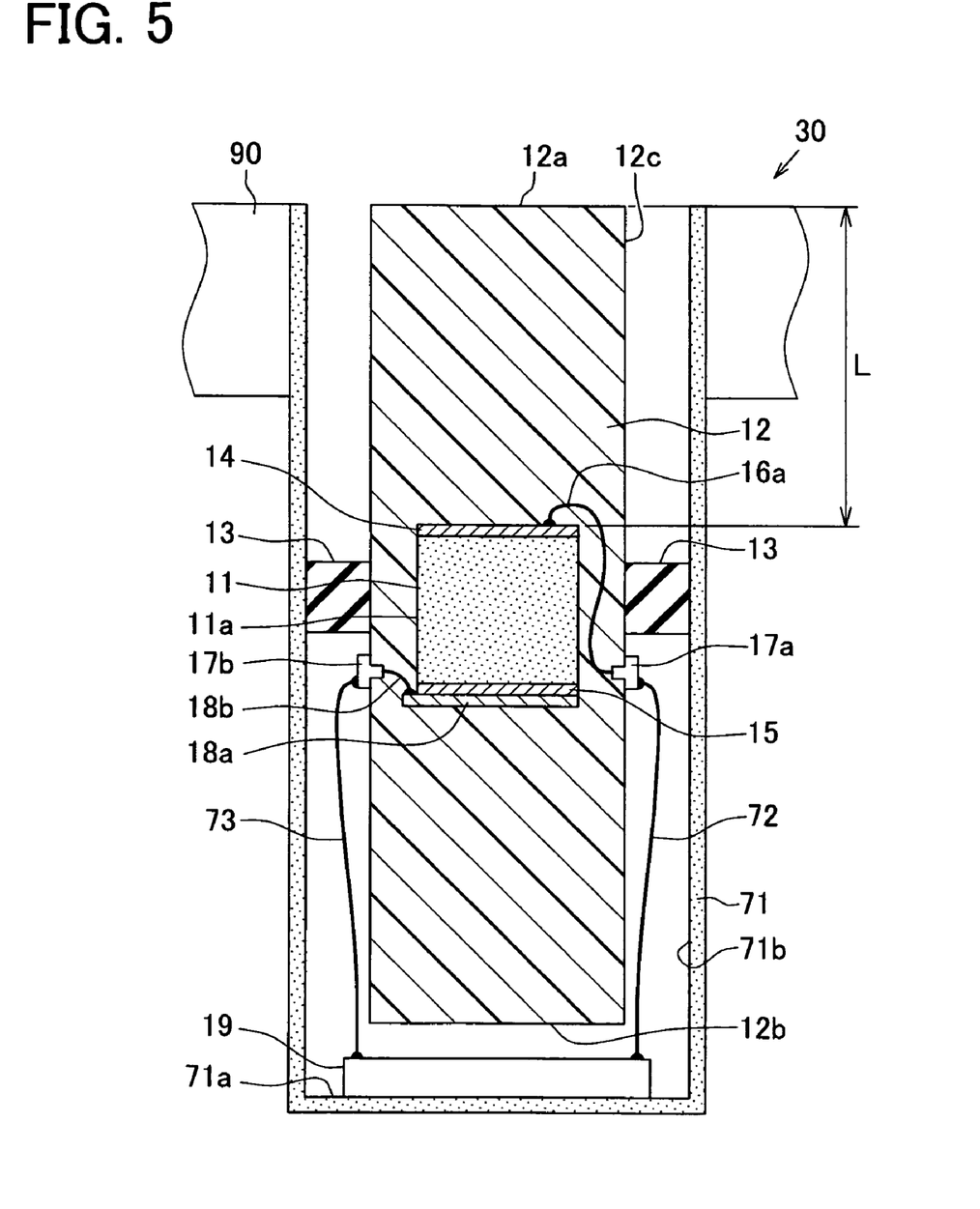
FIG. 5 is a cross sectional view showing an ultrasonic sensor according to a modification of the third embodiment.

FIG. 4 shows an ultrasonic sensor 30 according to a third embodiment, and FIG. 5 shows another ultrasonic sensor according to a modification of the third embodiment.

As shown in FIG. 4, in the sensor 30, the pad 17a connected to the first electrode 14 via the bonding wire 16a, and the pad 17b connected to the second electrode 15 via the electrode member 18a and the bonding wire 18b are arranged on the sidewall 12c of the acoustic matching element 12. The pads 17a, 17b are electrically connected to the circuit 19 arranged on the inner wall 71b of the case 71 via lead wires 72, 73.

Thus, the circuit 19 is arranged on the inner wall 71b of the case 71, so that designing degree of freedom is improved.

As shown in FIG. 5, the acoustic matching element 12 may have symmetry with respect to the piezoelectric element 11. Specifically, the bottom 12b of the acoustic matching element 12 is parallel to the second electrode 15, and the distance between the bottom 12b and the second electrode 15 is substantially equal to one-fourth of the wavelength of the ultrasonic wave in the acoustic matching element 12.

The acoustic matching element 12 vibrates symmetrically with respect to the piezoelectric element 11, so that the vibration of the acoustic matching element 12 is stable. Thus, the acoustic pressure is improved.

In this case, by sealing a groove on the reception surface 12a with material having elastic modulus smaller than material for holding a node, a foreign particle is prevented from penetrating in the groove without affecting the detection accuracy. Thus, the environmental resistance is improved.

In the sensor 10 according to the first embodiment and the sensor 20 according to the second embodiment, the sidewall 12c of the acoustic matching element 12 near the reception surface 12a is fixed to the opening of the case 71 via the vibration damping element 13. A center of the acoustic matching element 12 in the longitudinal direction may be fixed to the case 71. In this case, the center of the acoustic matching element 12 in the longitudinal direction provides a vibration node in a standing wave. The center of the acoustic matching element 12 is fixed to the case 71 so that a fixation portion (i.e., the center) of the acoustic matching element 12 does not restrict the vibration of the ultrasonic detection element. Thus, the attenuation of the vibration is reduced. Thus, signal intensity is increased, and the detection sensitivity is improved.

The sensor 30 provides effects similar to the sensor 10 according to the first embodiment. Further, since the pads 17a, 17b are formed on the sidewall 12c of the acoustic matching element 12, the circuit 19 is arranged on the inner wall 71b of the case 71. Thus, design degree of freedom is improved.

When the acoustic matching element 12 has symmetry with respect to the piezoelectric element 11, the acoustic matching element 12 vibrates symmetrically with respect to the piezoelectric element 11. Thus, the vibration of the acoustic matching element 12 is stable, so that the sensitivity and/or the acoustic pressure are improved.

Fourth Embodiment

Figure 6:
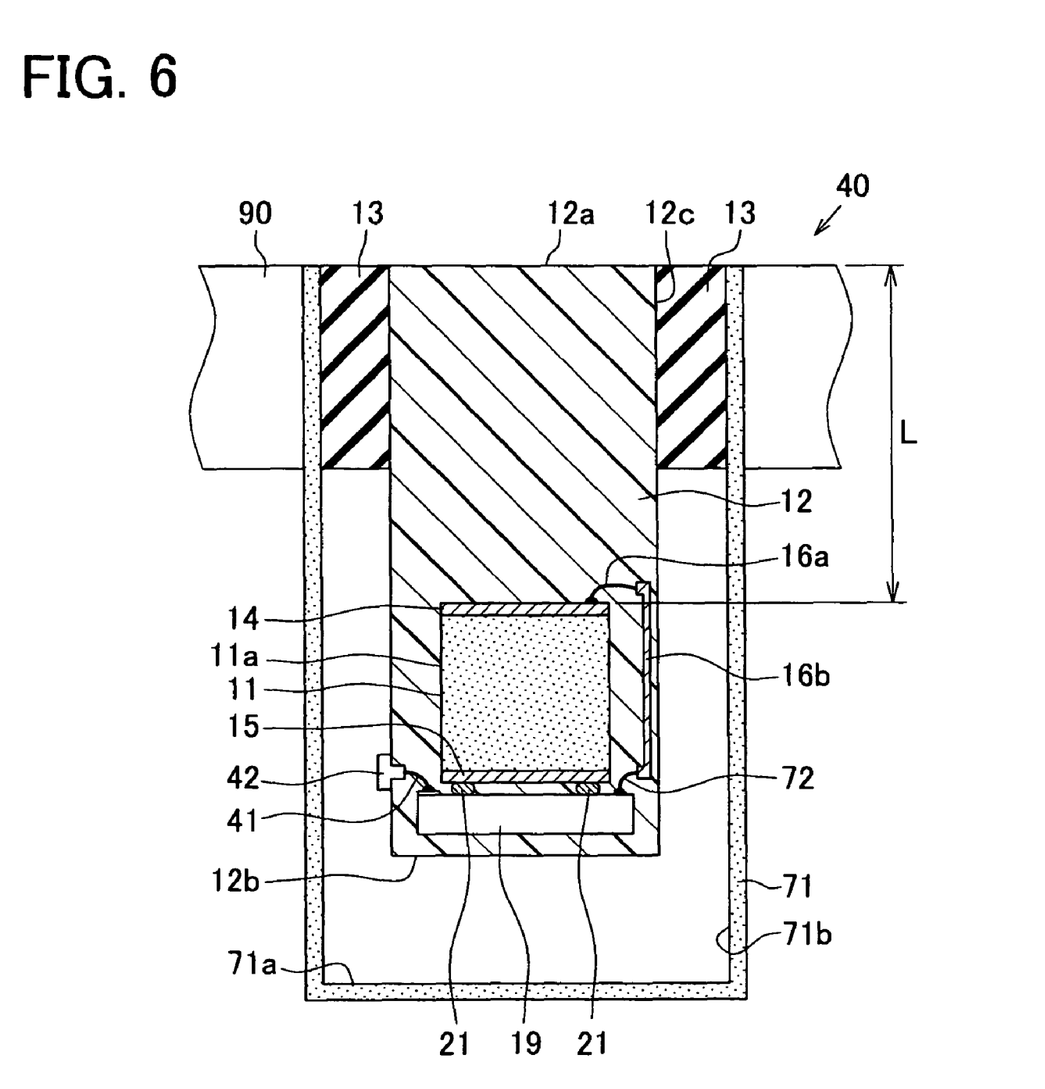
FIG. 6 is a cross sectional view showing an ultrasonic sensor according to a fourth embodiment.
Figure 7:
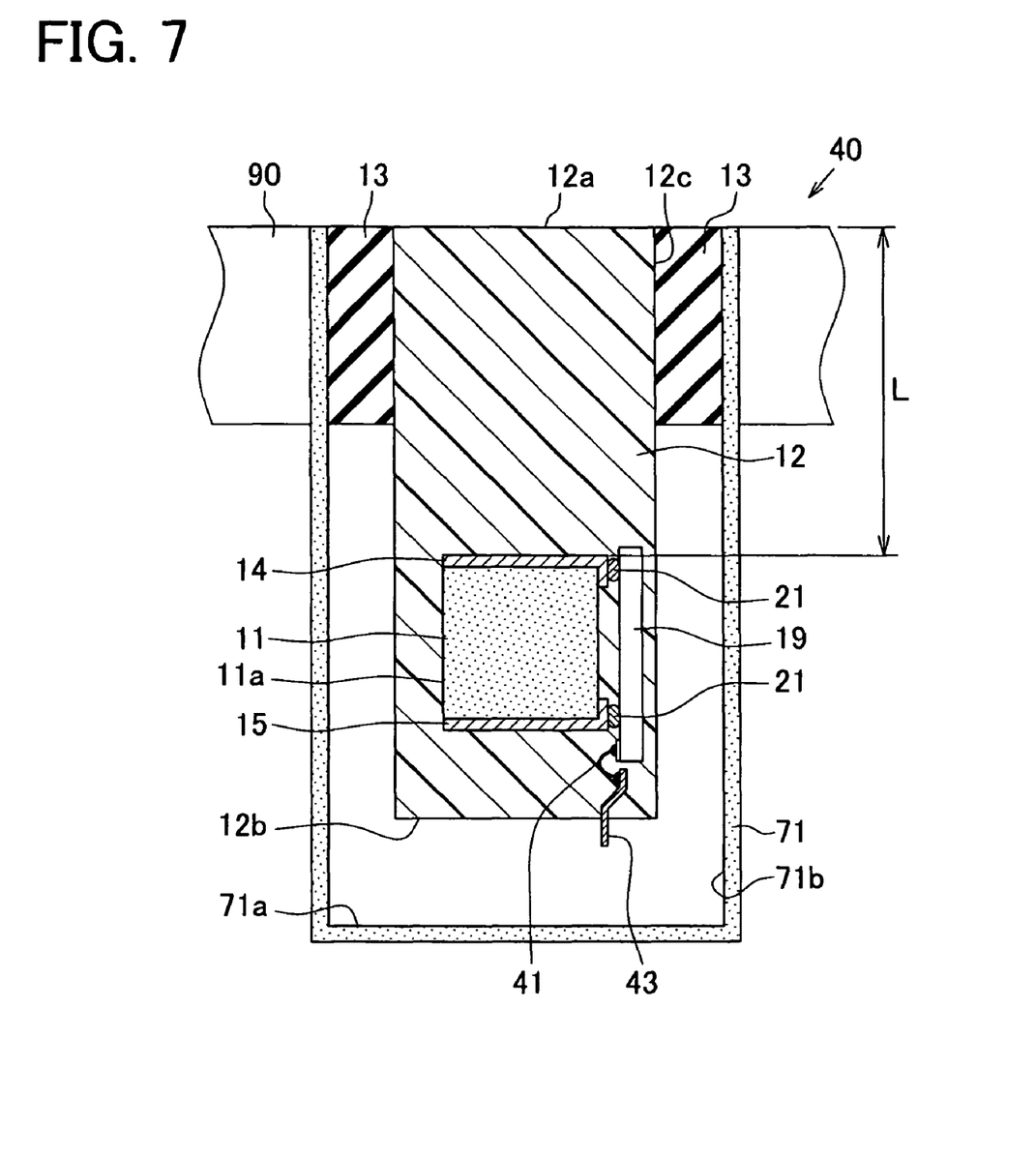
FIG. 7 is a cross sectional view showing an ultrasonic sensor according to a modification of the fourth embodiment.

FIG. 6 shows an ultrasonic sensor 40 according to a fourth embodiment, and FIG. 7 shows another ultrasonic sensor according to a modification of the fourth embodiment.

As shown in FIG. 6, in the sensor 40, the circuit 19 is also embedded in the acoustic matching element 12. In the circuit 19, a bonding wire 41 and a pad 42 for connecting to an external circuit such as an ECU are formed. Alternatively, a bump lead frame or the like may be formed in the circuit 19.

In the sensor 40, since the circuit 19 is embedded in the acoustic matching element 12, the environmental resistance and the impact resistance among the piezoelectric element 11, the wirings and the circuit 19 are improved.

Further, since the circuit 19 is arranged near the piezoelectric element 11, the wiring between the circuit 19 and the piezoelectric element 11 can be shortened. Thus, noise from the wiring is reduced, so that the detection sensitivity of the ultrasonic wave is improved.

As shown in FIG. 7, a part of the first electrode 14 and a part of the second electrode 15 may extend to reach the side wall 11a of the piezoelectric element 11 so that the extended parts of the first and second electrodes 14, 15 are connected to the circuit 19 via the bumps 21. The circuit 19 includes a bonding wire 41 and an external wiring 43 for connecting to an external device such as an ECU.

In this case, the sensor 40 provides the above described effects. Further, the length of the wirings in the sensor 40 is minimized.

The sensor 40 provides effects similar to the sensor 10 according to the first embodiment. Further, since the circuit 19 is embedded on the acoustic matching element 12, the environmental resistance and the impact resistance among the piezoelectric element 11, the wirings and the circuit 19 are improved.

Fifth Embodiment

Figure 8:
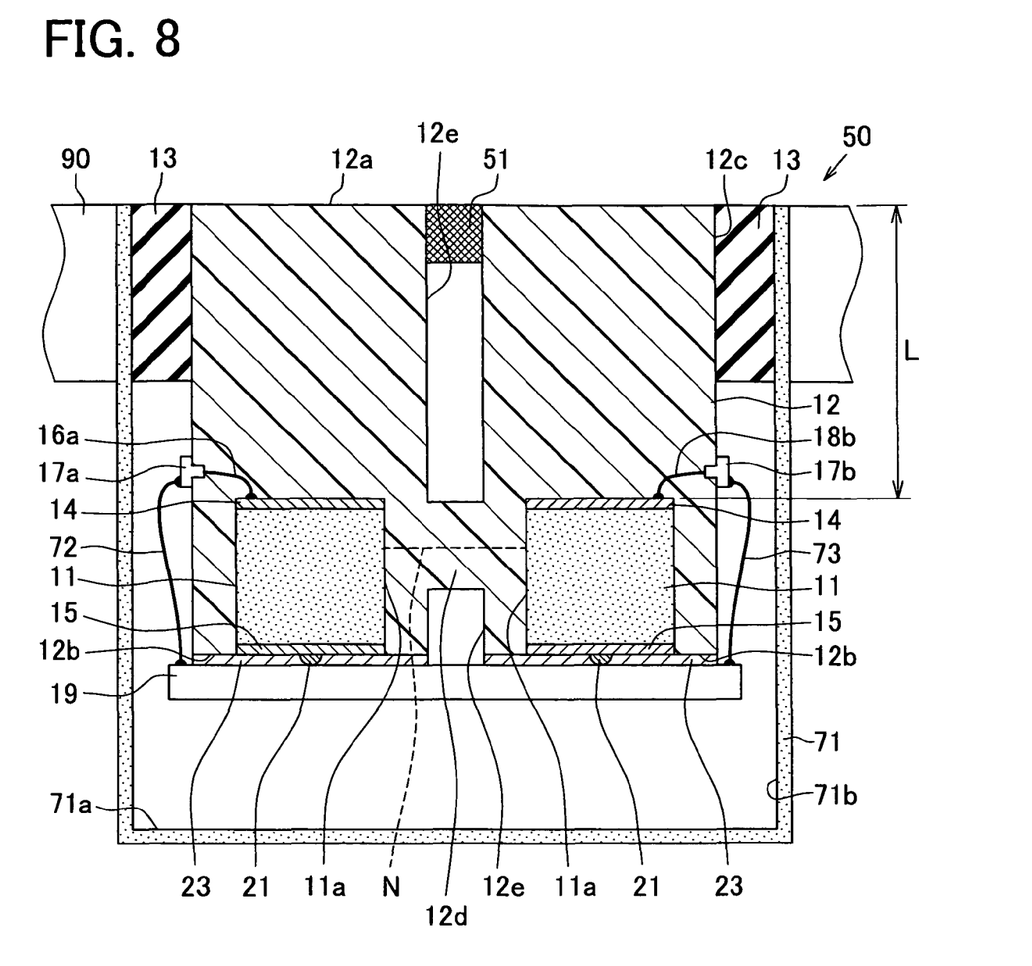
FIG. 8 is a cross sectional view showing an ultrasonic sensor according to a fifth embodiment.

FIG. 8 shows an ultrasonic sensor 50 according to a fifth embodiment.

In the sensor 50, multiple acoustic matching elements 12 and multiple piezoelectric elements 11 are aligned in an array. In this embodiment, the sensor 50 includes four acoustic matching elements 12 and four piezoelectric elements 11. Specifically, two pairs of the acoustic matching element 12 and four piezoelectric element 11 are aligned along with a lateral direction of the sensor 50, as shown in FIG. 8. Two pairs of the acoustic matching element 12 and four piezoelectric element 11 are aligned along with a depth direction of the sensor 50, which is not shown in FIG. 8. The depth direction is perpendicular to the lateral direction. In this embodiment, each acoustic matching element 12 and each piezoelectric element 11 correspond to the acoustic matching element 12 and the piezoelectric element 11 in the sensor 20 shown in FIG. 2. The sensor 50 detects a three dimensional position of an object to be detected.

The reception surfaces 12a of two acoustic matching elements 12 are divided by a slit 12e so that two acoustic matching elements 12 are connected to each other via a connection portion 12d, which is disposed near the vibration node N in the standing wave. Thus, the attenuation of the ultrasonic wave caused by restriction of the connection portion 12d is reduced, so that the signal strength is increased. Accordingly, the detection sensitivity of the ultrasonic wave is improved.

The opening of the slit 12e on the reception surface side is sealed with a filler 51 made of, for example, rubber or gel, which has elastic modulus lower than the acoustic matching element 12. The filler 51 protects the sensor 50 from moisture or foreign particle penetrating into the sensor 50 without deteriorating transmission of the ultrasonic wave.

Each piezoelectric element 11 is electrically coupled with the same circuit 19. Here, each piezoelectric element 11 may have an independent circuit 19.

Four pairs of the acoustic matching element 12 and the piezoelectric element 11 is formed such that four piezoelectric elements 11 are insert molded in one body of the acoustic matching element 12, and then, the slit 12e is formed in the one body of the acoustic matching element 12 along with the transmission direction of the ultrasonic wave so as to remain the connection portion 12d so that four acoustic matching elements 12 are formed.

The above method provides to reduce manufacturing steps and to improve positioning accuracy of the acoustic matching element 12 and the piezoelectric element 11, compared with a case where each piezoelectric element 11 is individually embedded in the corresponding acoustic matching element 12, and then, four pairs of the acoustic matching element 12 and the piezoelectric element 11 are connected with the connection portion 12d.

The sensor 50 includes multiple acoustic matching elements 12 and the piezoelectric elements 11 so that the time difference or the phase difference of the ultrasonic wave received by the piezoelectric elements 11 are obtained. Based on the difference, not only the distance between the sensor 50 and the object but also the position of the object is determined.

Each acoustic matching element 12 is formed such that the width W of the acoustic matching element 12 is equal to or smaller than a half of the wavelength of the ultrasonic wave in the air. The distance d between the centers of the two adjacent acoustic matching elements 12 is almost equal to the half of the wavelength of the ultrasonic wave in the air.

In the above case, the time difference is also determined based on the phase difference of the ultrasonic wave received by the piezoelectric elements 11. Accordingly, the time difference of the ultrasonic wave received by the piezoelectric elements 11 is detected with high accuracy, so that the detection accuracy of both the distance to the object and the position of the object are improved.

Here, even when the width W of the acoustic matching element 12 is not equal to or smaller than a half of the wavelength of the ultrasonic wave in the air, the three-dimensional position of the object is detected.

Since the reception surface 12a of the acoustic matching elements 12 is divided by the slit 12e, cross talk between multiple acoustic matching elements 12 and the piezoelectric elements 11 is not generated, so that the detection sensitivity of the ultrasonic wave is improved.

The connection portion 12d may be formed near the bottom 12b of the acoustic matching elements 12. Further, the connection portion 12d may be formed near the reception surface 12a of the acoustic matching elements 12 when the connection portion 12d is made of the same material as the vibration damping element 13.

Each sensor shown in FIGS. 1-7 according to the first to fourth embodiments may have multiple pairs of the acoustic matching elements 12 and the piezoelectric elements 11.

Although the number of the acoustic matching elements 12 and the piezoelectric elements 11 in the sensor 50 is four, the sensor 50 may have different number of the acoustic matching elements 12 and the piezoelectric elements 11. Further, the arrangement of the acoustic matching elements 12 and the piezoelectric elements 11 in the sensor 50 may be different from the sensor 50 shown in FIG. 8. For example, when the two dimensional position of the object is detected, the sensor 50 may have two pairs of the acoustic matching element 12 and the piezoelectric element 11.

The sensor 50 provides effects similar to the sensor 10 according to the first embodiment. Further, since the sensor 50 includes multiple pairs of the acoustic matching element 12 and the piezoelectric element 11, the time difference or the phase difference of the ultrasonic wave received by the piezoelectric elements 11 is detected so that not only the distance between the object and the sensor 50 but also the position of the object are detected on the basis of the time difference or the phase difference.

Each pair of the acoustic matching element 12 and the piezoelectric element 11 is fixed or connected to another pair of the acoustic matching element 12 and the piezoelectric element 11 at the connection portion 12d, which is disposed near the vibration node in the standing wave generated in the acoustic matching element 12. Thus, the attenuation of the ultrasonic wave caused by restriction of the connection portion 12d is reduced, so that the signal strength is increased. Accordingly, the detection sensitivity of the ultrasonic wave is improved. Since the reception surface 12a of the acoustic matching elements 12 is divided by the slit 12e, by holding the acoustic matching elements 12 at the connection portion 12d, which has a minimum amplitude of the ultrasonic wave, cross talk between multiple acoustic matching elements 12 and the piezoelectric elements 11 is not generated. Thus, the detection sensitivity of the ultrasonic wave is improved.

Other Embodiments

The wiring connecting between the piezoelectric element 11 and the circuit 19 may be made of conductive resin material or conductive rubber. For example, in the sensor 30 according to the third embodiment, the bonding wire 16a, the electrode member 18a and the bonding wire 18b may be replaced with a conductive resin wiring. In this case, the wiring can be formed by a double injection molding method when the piezoelectric element 11 is insert molded in the acoustic matching element 12. Thus, the amount of wiring is reduced, so that manufacturing steps of the sensor are simplified.

Figure 9:
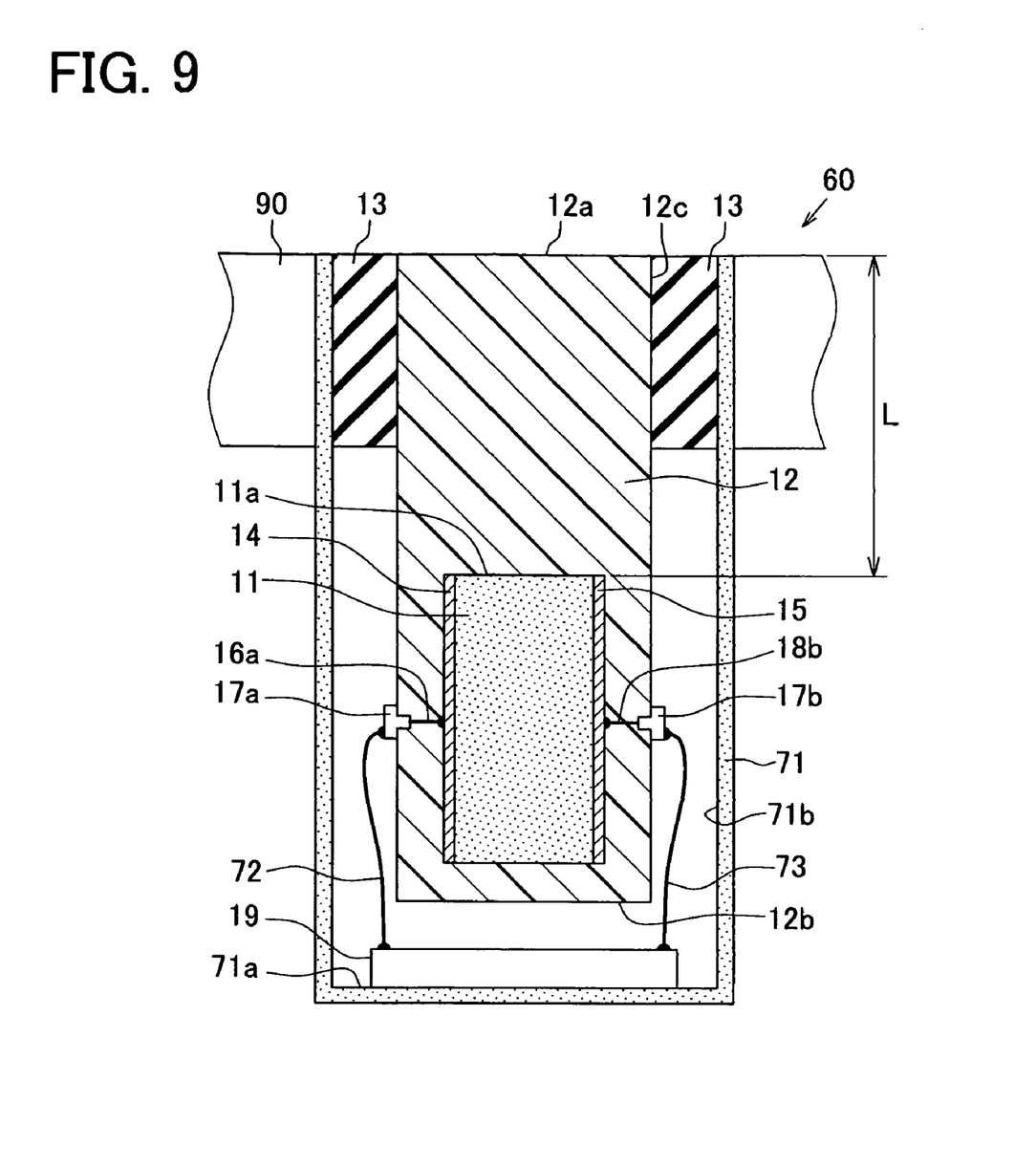
FIG. 9 is a cross sectional view showing an ultrasonic sensor according to a sixth embodiment.

As shown in FIG. 9, in an ultrasonic sensor 60, the piezoelectric element 11 is embedded in the acoustic matching element 12 such that the sidewall 11a of the piezoelectric element 11 adjacent to the first electrode 14 faces the reception surface 12a of the acoustic matching element 12.

The sensor 60 provides effects similar to the sensor 10 according to the first embodiment.

Further, the thickness of piezoelectric body along with a direction from the first electrode 14 to the second electrode 15, which face each other, may be limited. Here, the piezoelectric constant of the piezoelectric body along with the direction from the first to second electrodes 14, 15 is large. In the present embodiment, the ultrasonic wave is received by the sidewall 11a of the piezoelectric element 11 perpendicular to the first electrode 14 and adjacent to the first electrode 14. Here, the dimension of the sidewall 11a is not limited along with a direction parallel to the first electrode 14. Thus, the dimension of the piezoelectric element 11 along with the direction parallel to the first electrode 14, i.e., along with the transmission direction of the ultrasonic wave, can be increased. Thus, the detection sensitivity of the sensor is improved.

The piezoelectric element 11 may be used for a receiving and transmitting element for transmitting and receiving the ultrasonic wave.

Figure 10A:
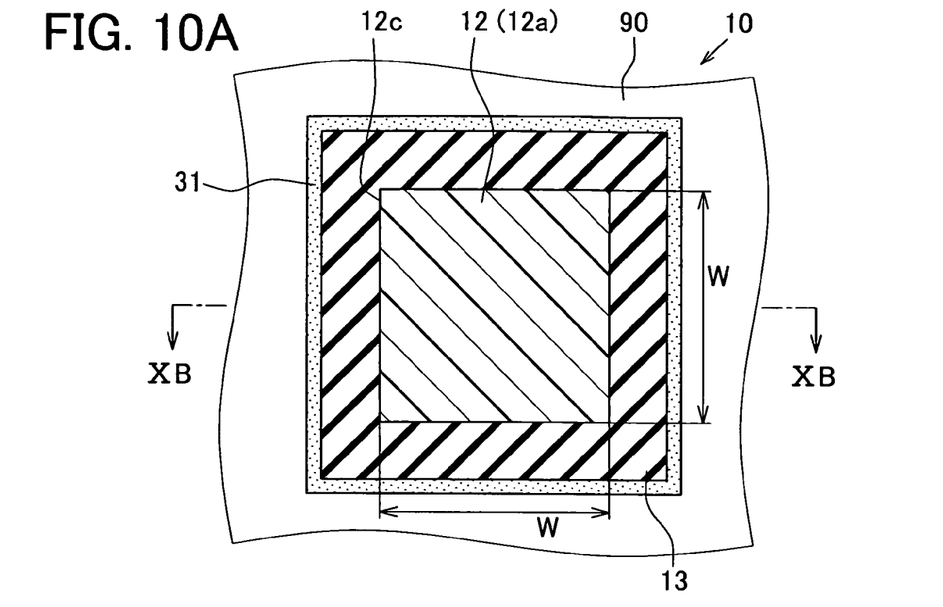
FIG. 10A is a plan view showing an ultrasonic sensor having an elastic element according to a seventh embodiment.
Figure 10B:
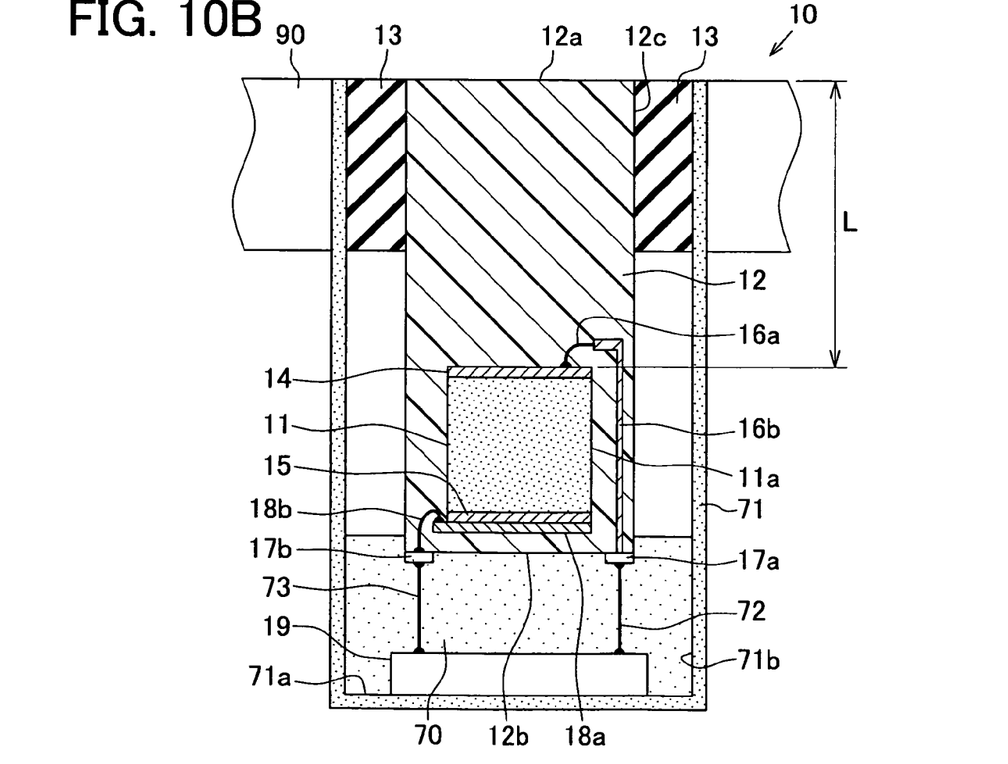
FIG. 10B is a cross sectional view showing the sensor taken along line XB-XIB in FIG. 10A.

The acoustic matching element 12 and the case 71 may be partially or completely covered with elastic member. For example, as shown in FIG. 10, the elastic member 70 may be partially formed between the bottom 12b of the acoustic matching element 12 and the bottom 71a of the case 71, and between the sidewall 12c of the acoustic matching element 12 and the inner surface 71b of the case 71. Thus, when impact is applied to the acoustic matching element 12, the impact is absorbed by the elastic member 70. Thus, the impact resistance of the sensor 10 is improved.

While the invention has been described with reference to preferred embodiments thereof, it is to be understood that the invention is not limited to the preferred embodiments and constructions. The invention is intended to cover various modification and equivalent arrangements. In addition, while the various combinations and configurations, which are preferred, other combinations and configurations, including more, less or only a single element, are also within the spirit and scope of the invention.

What is claimed is:

1. An ultrasonic sensor for detecting an object, comprising:
a piezoelectric element having a piezoelectric body and first and second electrodes for sandwiching the piezoelectric body, wherein the piezoelectric element detects an ultrasonic wave reflected by the object, the ultrasonic wave being initially transmitted from a transmitting element;
an acoustic matching element having a reception surface, which faces the first electrode and receives the ultrasonic wave reflected by the object, wherein the acoustic matching element transmits the ultrasonic wave from the reception surface to the piezoelectric body via the first electrode; and
a circuit electrically coupled with the piezoelectric element via a conductive element and processing a voltage signal output from the piezoelectric element, wherein
the piezoelectric element is embedded in the acoustic matching element so that the acoustic matching element covers at least the first electrode and a part of the conductive element between the circuit and the piezoelectric element,
a sidewall of the piezoelectric element is adjacent to the first electrode,
the acoustic matching element covers a whole surface of the piezoelectric element,
the acoustic matching element has symmetry with respect to the piezoelectric element,
the acoustic matching element has a bottom surface, which faces the second electrode,
a first distance between the reception surface and the first electrode is substantially equal to one-fourth of a wavelength of the ultrasonic wave transmitting through the acoustic matching element, and
a second distance between the bottom surface and the second electrode is substantially equal to one-fourth of a wavelength of the ultrasonic wave transmitting through the acoustic matching element.

2. An ultrasonic sensor for detecting an object, comprising:
a piezoelectric element having a piezoelectric body and first and second electrodes for sandwiching the piezoelectric body, wherein the piezoelectric element detects an ultrasonic wave reflected by the object, and the ultrasonic wave is initially transmitted from a transmitting element;
an acoustic matching element having a reception surface, which receives the ultrasonic wave reflected by the object, wherein the acoustic matching element transmits the ultrasonic wave from the reception surface to the piezoelectric body; and
a circuit electrically coupled with the piezoelectric element via a wire and processing a voltage signal output from the piezoelectric element, wherein
the reception surface faces a sidewall of the piezoelectric element, the sidewall which is adjacent to the first electrode,
the piezoelectric element is embedded in the acoustic matching element so that the acoustic matching element covers at least the first electrode and a part of the wire between the circuit and the piezoelectric element,
the acoustic matching element covers a whole surface of the piezoelectric element,
the acoustic matching element has symmetry with respect to the piezoelectric element,
the acoustic matching element has a bottom surface, which faces the second electrode,
a first distance between the reception surface and the first electrode is substantially equal to one-fourth of a wavelength of the ultrasonic wave transmitting through the acoustic matching element, and
a second distance between the bottom surface and the second electrode is substantially equal to one-fourth of a wavelength of the ultrasonic wave transmitting through the acoustic matching element.

3. An ultrasonic sensor for detecting an object, comprising:

a case attached to a body of the vehicle via a vibration damping element, wherein the vibration damping element reduces a vibration from the body;

a piezoelectric element having a piezoelectric body and first and second electrodes for sandwiching the piezoelectric body, wherein the piezoelectric element detects an ultrasonic wave reflected by the object, and the ultrasonic wave is initially transmitted from a transmitting element;

an acoustic matching element having a reception surface, which faces the first electrode and receives the ultrasonic wave reflected by the object, wherein the acoustic matching element transmits the ultrasonic wave from the reception surface to the piezoelectric body via the first electrode; and a circuit electrically coupled with the piezoelectric element via a wire and processing a voltage signal output from the piezoelectric element, wherein the case accommodates the piezoelectric element, the acoustic matching element and the circuit the piezoelectric element is embedded in the acoustic matching element so that the acoustic matching element covers the first and second electrodes and a part of the wire between the circuit and the piezoelectric element, the sidewall of the piezoelectric element is disposed between the first and second electrodes, the acoustic matching element covers a whole surface of the piezoelectric element, the acoustic matching element has symmetry with respect to the piezoelectric element, the acoustic matching element has a bottom surface, which faces the second electrode, a first distance between the reception surface and the first electrode is substantially equal to one-fourth of a wavelength of the ultrasonic wave transmitting through the acoustic matching element, and a second distance between the bottom surface and the second electrode is substantially equal to one-fourth of a wavelength of the ultrasonic wave transmitting through the acoustic matching element.

4. An ultrasonic sensor for detecting an object comprising:

a piezoelectric element having a piezoelectric body and first and second electrodes, the first and second electrodes sandwiching sidewalls of the piezoelectric body, the piezoelectric element configured to detect an ultrasonic wave, which is initially transmitted from a transmitting element and reflected by the object;

an acoustic matching element having a reception surface and a bottom surface, the reception surface facing the first electrode, the bottom surface facing the second electrode, the acoustic matching element configured to receive the ultrasonic wave reflected by the object via the reception surface and to transmit the ultrasonic wave from the reception surface to the piezoelectric body via the first electrode;

a circuit electrically coupled with the piezoelectric element via a wire and configured to process a signal output from the piezoelectric element; and a wire connecting the circuit with the piezoelectric element, wherein the piezoelectric element is embedded in the acoustic matching element so that the acoustic matching element covers at least a whole surface of the piezoelectric element, the first and second electrodes, and a part of the wire, the acoustic matching element has symmetry with respect to the piezoelectric element, a first distance between the reception surface and the first electrode is substantially equal to one-fourth of a wavelength of the ultrasonic wave transmitting through the acoustic matching element, and a second distance between the bottom surface and the second electrode is substantially equal to one-fourth of a wavelength of the ultrasonic wave transmitting through the acoustic matching element.

* * * * *